(12) United States Patent
Lyons et al.

(10) Patent No.: US 7,819,307 B2
(45) Date of Patent: Oct. 26, 2010

(54) METHOD AND SYSTEM FOR MANAGING MONETARY VALUE ON A MOBILE DEVICE

(75) Inventors: Robert E. Lyons, Alamo, CA (US); Rama Chandra D. S. Murthy, Sunnyvale, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1394 days.

(21) Appl. No.: 11/260,061

(22) Filed: Oct. 27, 2005

(65) Prior Publication Data
US 2007/0095892 A1    May 3, 2007

(51) Int. Cl.
*G06F 17/60*    (2006.01)
(52) U.S. Cl. ...................... 235/379; 235/380
(58) Field of Classification Search .............. 235/379, 235/380, 382
See application file for complete search history.

(56) References Cited

U.S. PATENT DOCUMENTS

| 5,991,749 A | * | 11/1999 | Morrill, Jr. ............ 705/44 |
| 6,142,369 A | * | 11/2000 | Jonstromer ............ 235/380 |
| 7,340,244 B1 | * | 3/2008 | Osborne et al. ........ 455/414.1 |

* cited by examiner

Primary Examiner—Daniel Stcyr

(57) ABSTRACT

Aspects of the present invention feature a method of managing a monetary value stored in an electronic wallet of a mobile device. These management operations include receiving an indication that the mobile device from a mobile device account of a mobile device carrier cannot be located and is either lost or stolen. Subsequently, a determination is made to see if the mobile device has an associated electronic wallet capable of storing a monetary value. Generally, the use of mobile device and access to electronic wallet is blocked in response to determination that mobile device has an associated electronic wallet. In addition, the electronic wallet can be flagged such that the electronic wallet associated with mobile device will be drained of monetary value as well as being blocked.

24 Claims, 6 Drawing Sheets

METHOD AND SYSTEM FOR MANAGING MONETARY VALUE ON A MOBILE DEVICE

BACKGROUND

Mobile devices are rapidly being embedded with additional and useful everyday functions. Increased processing power and sophisticated embedded software applications allows these devices to be used for data storage/retrieval, voice and data communication, photography, videos, games and financial transactions. Users are willing to purchase or upgrade to these more advanced and sometimes more expensive mobile devices as they serve multiple functions and may eliminate the need for multiple discrete devices. For example, a smart phone with a camera can be used in place of a separate camera, a photo album, an MP3 player, video camera and many other functions.

People increasingly use mobile devices to purchase items and transact business. Encryption routines built into the mobile devices already provide people with sufficient privacy and security to perform small to medium financial transactions. Bluetooth, infra-red, near-field communication (NFC) and RFID (radio frequency identification) tags built into the mobile devices enable the mobile device to interact with other devices and point-of-sale terminals. For example, these wireless connections can be used to transmit or authorize payment for goods or services at the point-of-sale device.

Even though these transactions may be smaller in nature, the aggregate business being transacted is large and growing rapidly in acceptance. These smaller value transactions often referred to as micropayments have also spawned the growth of larger transactions dubbed macropayments. Over time, improving infrastructure used by these mobile devices will continue to increase both the size of the transactions being performed as well as the commercial viability associated with large scale and widespread deployment. Clearly, these types of transaction will occupy an ever increasing and important segment of the economy and provide revenue for businesses in the years to come.

In some cases, it is necessary to load the mobile device with a monetary value or money before any goods or services can be purchased. The monetary value typically resides in an electronic wallet built into the hardware and/or software of the phone and protected using encryption, a personal identification number (PIN) and other safeguards. As purchases are made with the mobile device, these electronic "funds" are moved from the electronic wallet to the electronic wallet or other holding area associated with the point-of-sale terminal or device thus consummating the financial transaction in real-time. As an alternative to the electronic wallet based transaction, the mobile device can also be used to authorize a payment to be made to the point-of-sale terminal at a later point. However, this latter approach is more complex and less desirable as the payment is not immediate and may not clear if the account to be debited is overdrawn or closed.

Given the complexity of financial transactions, there are many problems to be considered when using a mobile device to make payments and purchases. In general, the mobile device and supporting infrastructure needs to provide adequate control over the monetary value being transacted as well as confidence that the monetary value loaded on a mobile device is secure.

BRIEF DESCRIPTION OF THE DRAWINGS

The present invention is illustrated by way of example and not limitation in the figures of the accompanying drawings in which.

Like reference numbers and designations in the various drawings indicate like elements.

SUMMARY OF THE INVENTION

Figure 1:
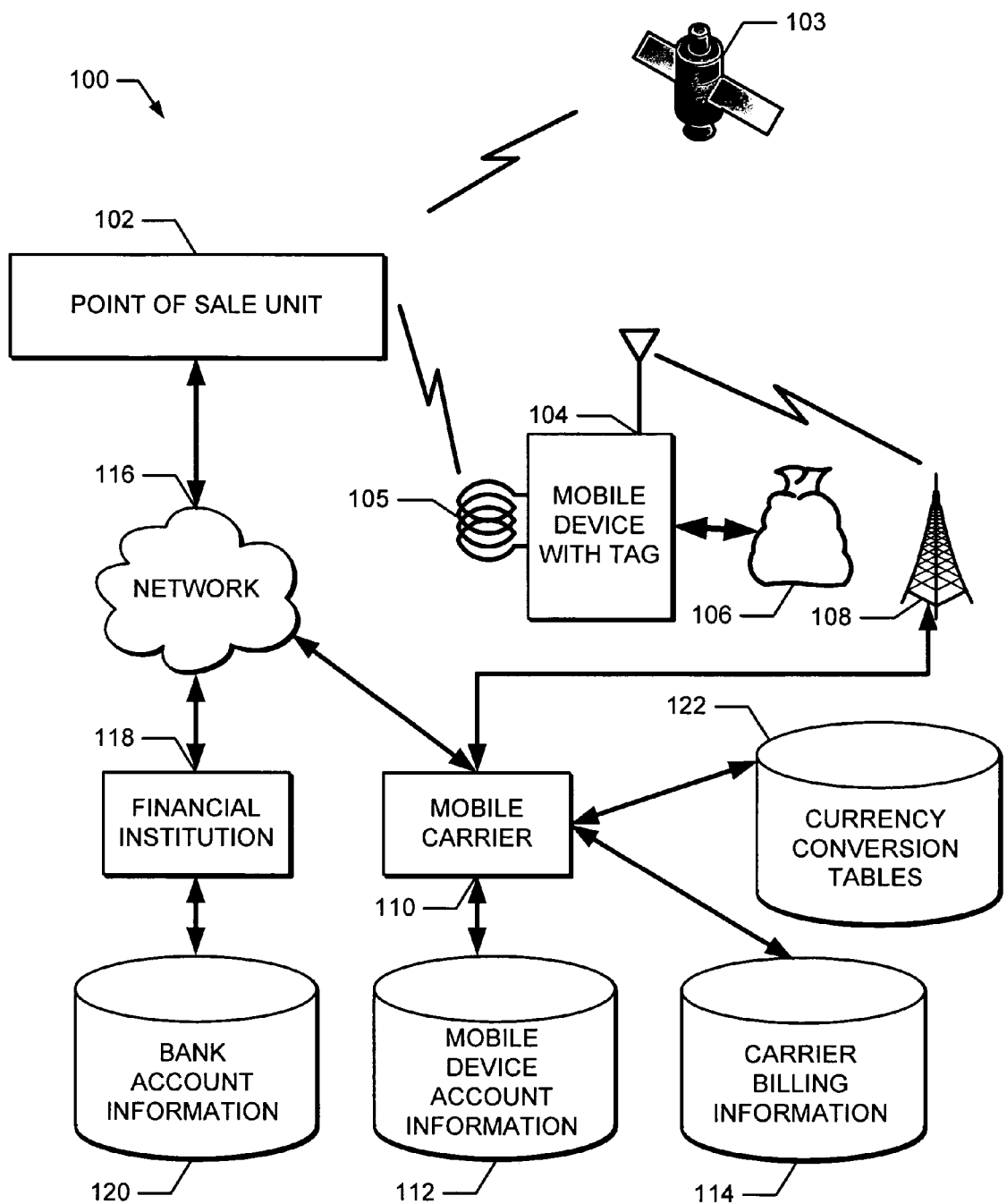
FIG. 1 is a block diagram illustrating a system for managing the monetary value on a mobile device in accordance with one implementation of the present invention.

One aspect of the present invention features a method for associating a monetary value with a mobile device. First, a request is received to store a monetary value into an electronic wallet of a mobile device. Using a mobile identifier to identify the mobile device, a determination is made to see if the mobile device is associated with a bank account from a financial institution in addition to a mobile device account from a mobile device carrier. When authorized, the requested monetary value is transferred from the bank account provided the bank account contains at least sufficient funds to fulfill the request for the monetary value.

Yet another aspect of the present invention features a method of managing a monetary value stored in an electronic wallet of a mobile device. This management operation includes receiving an indication that the mobile device from a mobile device account of a mobile device carrier cannot be located and is either lost or stolen. Subsequently, a determination is made to see if the mobile device has an associated electronic wallet capable of storing a monetary value. Generally, use of the mobile device and access to the electronic wallet is blocked in response to determination that mobile device has an associated electronic wallet. In addition, the electronic wallet can be flagged such that the electronic wallet associated with mobile device will be drained of monetary value in addition to being blocked.

Another aspect of the present invention includes a method of transacting a monetary value stored in an electronic wallet. This includes identifying a mobile device on a mobile device network according to a mobile identifier associated with the mobile device. A check of the mobile device account is used to determine if the mobile device on the mobile device network has an electronic wallet to be drained of monetary value.

Some or all of the monetary value from the mobile device can be drained as requested by removing some or all of the monetary value from the electronic wallet as requested.

DETAILED DESCRIPTION

Aspects of the present invention are advantageous in at least one or more of the following ways. An electronic wallet can be loaded with monetary value in different currencies to facilitate business with many different financial institutions around the world. The monetary value can be stored in a native or source currency and converted in real-time the currency of the country where the device holder is currently requesting a transaction—the target currency. Other aspects of the invention allow for a predetermined amount of currency to be converted from a source currency into a target currency initially to avoid transaction costs of converting into the target currency for each transaction. In volatile currency markets, this allows a person to use more favorable currency exchange rates prior to an actual purchase by converting a sum certain to a target currency in advance. If the monetary value is not spent, then the money can be converted back into a native currency when exchange rates are more favorable yet again.

Another aspect of the invention provides more control over the monetary value in an electronic wallet in a mobile device. The mobile device containing the electronic wallet and monetary value can be stolen or lost without the owner losing any money. Instead, the owner reports the mobile device as lost/stolen and then requests that the electronic wallet be drained and the money either safely returned to a bank account or held in a suspense account from the mobile carrier. Likewise, the mobile device carrier may also benefit as they can provide more mobile devices capable of financial transactions without necessarily incurring financial losses due to loss or theft. They also may be able to gain some or all interest on the money stored in suspense account.

Aspects of the invention can also be used to retain mobile accounts in the event a phone is lost or stolen. Once the device is reported lost or stolen, the device holder is instructed to return to the carrier's office and obtain a replacement device. Rather than losing the money stored on the electronic wallet of the lost/stolen device, the remaining money or monetary value is instead transferred and credited to the new replacement device. This is advantageous to the carrier as the user has an incentive to continue with the same service provider and not lose the monetary value on the phone. Indirectly, this is also advantageous to the banks as there is no accounting required for the lost value since the money is transferred to another mobile device by the carrier.

While these are some of the benefits provided, this is by no means meant to be an exhaustive list but merely an illustrative set of examples. It is contemplated that many other benefits can be realized by those skilled in the art when implementing one or more different aspects of the present invention as described hereinabove and below.

FIG. 1 is a block diagram illustrating a system 100 for managing the monetary value on a mobile device. System 100 includes a point-of-sale (POS) unit 102, a satellite 103, a mobile device 104, a monetary value 106, a base station 108, a mobile carrier 110, mobile device account information 112, carrier billing information 114, a financial institution 118, account information 120 and currency conversion tables 122 all accessible over network 116.

POS unit 102 generally facilitates dispensing of goods or services. It can be a machine that dispenses these goods or services as well as a cash register type device used in conjunction with a storefront or other sales venue. In any of these or other configurations, POS unit 102 is capable of communicating using one or more combinations of wired or wireless communication modalities. For example, POS unit 102 can access network 116 using conventional wired networking or wirelessly through satellite 103, tag 105, terrestrial base station 108 as well as any near-field communication (NFC), Bluetooth, infra-red, or other wireless communication mediums. Tag 105 may also communicate using a combination of one or more different wireless protocols or standards including RFID, NFC, Bluetooth, 802.11x, infra-red (IR) and other protocols.

POS unit 102 may be configured to communicate over one or more of these different modalities depending on the specific installation and needs required from the particular POS unit 102. For example, POS unit 102 located in an urban setting may be wired directly to network 116 while another POS unit 102 located in a more rural setting may be required to use microwave or other wireless frequencies to communicate with a satellite 103 uplink. It is also possible that POS unit 102 may communicate over terrestrial base station 108 in an urban setting if distances between POS unit 102 and base station 108 are suitable. In either of these or other scenarios, POS unit 102 may operate as an RFID interrogator device to communicate with mobile device 104 through tag 105 as illustrated.

Mobile device 104 having tag 105 is capable of storing and distributing monetary value 106 in accordance with implementations of the present invention. Additionally, mobile device 104 may serve as a wireless phone, a personal digital assistant (PDA), a smart phone, a computing platform, a portable music or multi-media player, or any other device that benefits from having a built in electronic wallet with monetary value 106. In one implementation, mobile device 104 is a wireless phone capable of transmitting voice/data through base station 108 to other similarly capable voice/data devices. Software, firmware and hardware designed in accordance with the present invention and described later herein partially resides on mobile device 104 and manages monetary value 106. These subsystems on mobile device 104 use tag 105 to interface with POS unit 102 and other similar devices however tag 105 can also be used for inventory control and general tracking purposes.

In one implementation, mobile device 104 may be implemented with one or more different types of smartcards or other embedded chip technologies. For example, one implementation may use the Europay/MasterCard/Visa (EMV) chip to perform both smart card and electronic wallet functionality. The EMV chip is based upon a specification that is being implemented worldwide to provide interoperability between the member card associations and other participants. Accordingly, mobile device 104 having EMV compatible chips can interoperate with EMV compatible terminals being deployed internationally.

Mobile carrier 110 represents the business and infrastructure that operates system 100 and manages the interaction with mobile device 104. In one implementation, mobile carrier 110 is a conventional wireless phone company that builds or makes available infrastructure including base station 108, network 116 and other subsystems to complete a voice/data network. Typically, mobile carrier 110 allows mobile device 104 to utilize system 100 for a service fee and provides additional charges for other services used during a time interval. For example, mobile carrier 110 may charge a basic access fee for mobile device 104 to communicate voice/data over base station 108 for purposes of exchanging information with other mobile devices/computer systems (not illustrated).

In accordance with implementations of the present invention, mobile carrier 110 may also receive fees for processing monetary value 106 through system 100 which may include but is not limited to service charges for interfacing with a financial institution 118, extending short term credit and receiving interest on monetary value 106 being held on behalf of mobile device 104 or POS unit 102 before, during or after a transaction. Detailed information on mobile device 104 is generally kept by mobile carrier 110 in mobile device account information 112 database. This may not only include general mobile device account information but also may include specific preferences associated with using mobile device 104 to exchange monetary value 106 with POS unit 102 and other participants in a transaction.

For example, this information can flag a mobile device 104 as lost or stolen, indicate credit limits on the amount of monetary value 106 to be held by mobile device 104 and a preferred source currency for storing monetary value 106. Currency conversion tables 122 accessible by mobile carrier 110 may be maintained by financial institution 118 or other authority allowing mobile carrier 110 to oversee the proper conversion from a source or default currency into a target currency used with POS unit 102. In one implementation, each currency used in currency conversion tables 122 or related databases follow the code convention set forth by the ISO (International Standards Organization) on currency.

More confidential information kept in mobile device account information 112 database may include privacy information, credit line information, interest rate charged for short term loans extended to mobile device 104, a personal identification number (PIN) as well as confidential information for accessing bank account and other information from financial institution 118. These datasets can optionally be encrypted using sufficiently long keys to deter or prevent access from unauthorized individuals. Once a month or at another interval, mobile carrier 110 accesses carrier billing information 114 database to determine the total charges to be billed against the mobile device account associated with mobile device 104. If permission has been granted, mobile carrier 110 may directly debit a bank account or charge a credit card associated with mobile device 104 for the taxes, base access fees and service charges associated with purchases made using monetary value 106 during this interval of service.

Financial institution 118 can be any business that holds funds in one or more currencies and makes funds accessible to mobile device 104 in accordance with implementations of the present invention. Schematically, bank account information 120 database includes any information needed by financial institution to facilitate transactions involving monetary value 106 being stored or used by mobile device 104 in conjunction with POS unit 102 or any other participants in the transaction. For example, relevant information to facilitate these transactions may include credit line information, a list of mobile carriers authorized to move monetary value 106 onto mobile device 104 and account balance information. While this information is depicted in FIG. 1 in a single database, this information can be maintained in one or several databases as well as may be assembled dynamically as needed for the particular transaction or event.

In one implementation, mobile device 104 requests monetary value 106 from an electronic wallet securely embedded into mobile device 104. If the required amount is not already present, mobile carrier 110 is contacted wirelessly through base station 108 and authorized to obtain the necessary funds either through an extension of credit or directly from a bank account held with financial institution 118. Generally, this information is transmitted securely over network 116 and down to mobile carrier 110 where the transaction is recorded in carrier billing information 114 and elsewhere for future reference. Depending on the source currency provided by financial institution 118 and the desired or target currency needed for the transaction with POS unit 102 there may be a currency conversion performed vis a vis currency conversion tables 122.

In either event, the resulting monetary value is uploaded to mobile device 104 back over base station 108 and stored in the electronic wallet as needed. POS unit 102 receives some or all of this monetary value 106 as transmitted through tag 105 or other short range secure point-to-point transfer mechanism. In return, POS unit 102 may verify the authenticity and validity of the monetary value 106 by accessing a portion of mobile device account information 112 through satellite 103 uplink, network 116 or even base station 108. Optionally, POS unit 102 may also choose not to verify the authenticity and validity of the monetary value 106 and instead rely upon receiving a valid PIN. Assuming the mobile device account is valid and not blocked, POS unit 102 receives monetary value 106 as intended and dispenses the requested goods and/or services. As will be described later herein, it is also possible that mobile device 104 has been lost or stolen and thus monetary value 106 has been drained from electronic wallet in accordance with the present invention. Consequently, electronic wallet may be empty and thus POS unit 102 can refuse to complete the transaction on this basis as well.

Figure 2:
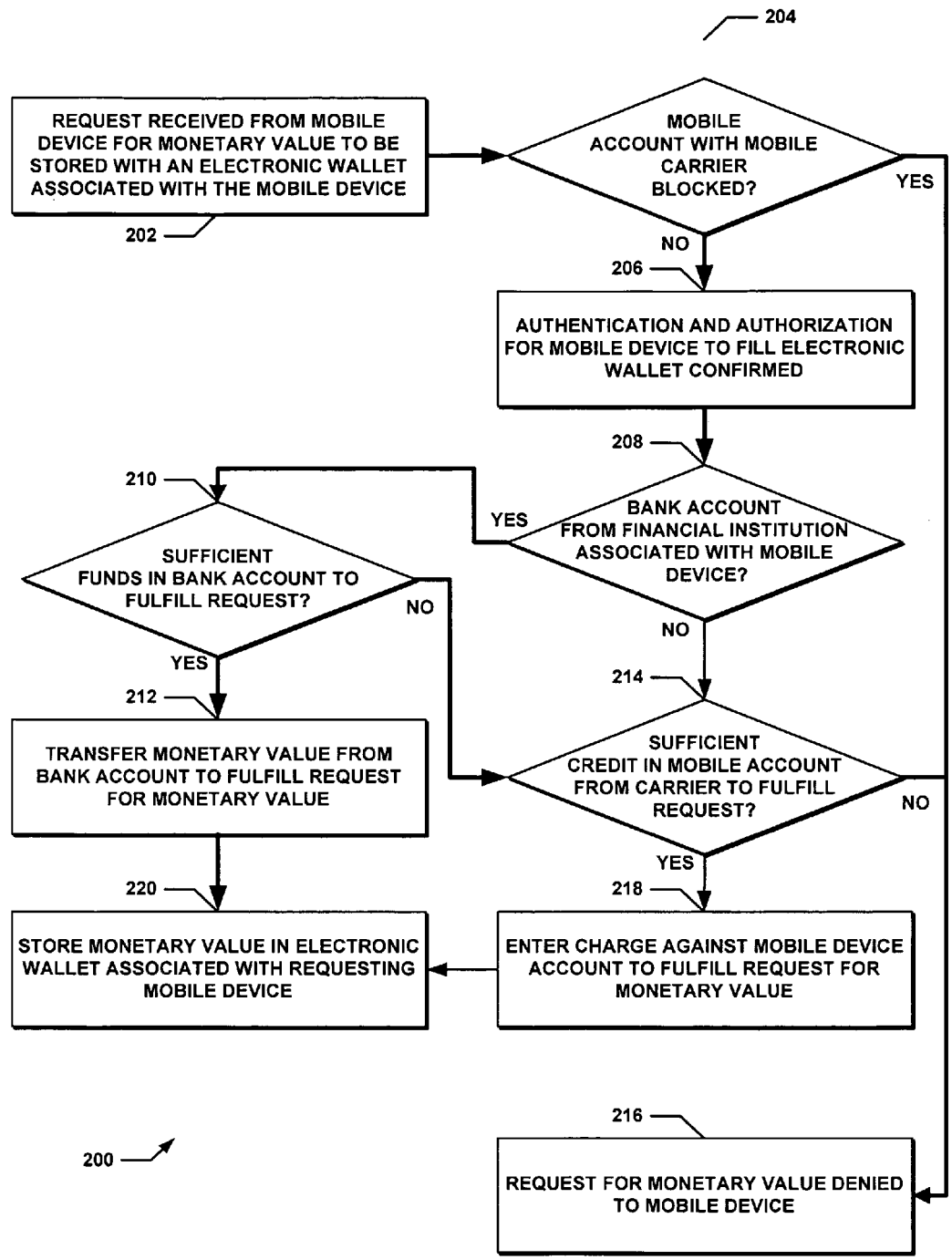
FIG. 2 is a flowchart diagram depicting the operations associated with loading an electronic wallet of a mobile device in accordance with one implementation of the present invention.

FIG. 2 is a flowchart diagram 200 depicting the operations associated with loading an electronic wallet of a mobile device in accordance with one implementation of the present invention. Initially, a mobile carrier receives a request from a mobile device for a monetary value to be stored in an electronic wallet (202). This presumes that the electronic wallet of the mobile device does not already contain sufficient monetary value to complete the requested transaction. Otherwise, the mobile device would likely not need to obtain additional funds.

Assuming the request is otherwise valid, the mobile carrier may then determine if the mobile account with the mobile carrier has been blocked (204). The account may be blocked for any number of reasons including non-payment of an invoice from the mobile carrier or, more importantly, that the mobile device has been lost or stolen. Monetary value on the device still remains the property of the device owner and therefore may be recovered later in time. If the mobile device account has been blocked then the request for additional or any monetary value will be denied (216). Blocking a phone will not allow future downloads even if a valid PIN is provided until the phone is unblocked. For example, this prevents an unauthorized user of the mobile device from increasing the monetary value stored in the electronic wallet of a mobile device reported as lost or stolen.

For an unblocked account, the mobile carrier determines if proper authentication and authorization has been provided for the mobile device to fill the electronic wallet (206). This may include but is not limited to obtaining a mobile identifier assigned to the mobile device and correlating with a bank account from a financial institution in addition to a mobile device account from the mobile carrier. It is likely that the electronic serial number (ESN) of the mobile device is used along with a PIN provided by a user to authenticate both the user and the phone being used to access the bank account, credit line or other source of monetary value. It is important that the mobile identifier such as an ESN or other code closely associated with the mobile device is used as it uniquely identifies the mobile device and prevents other mobile devices from performing unauthorized transactions. For example, a mobile device with a different ESN or other mobile identifier would not be able to process any transactions in accordance with implementations of the present invention. Further, there should also be information associated with the particular mobile device account providing the mobile carrier authorization to load monetary value onto the electronic wallet.

When a bank account from the financial institution is identified and authorization provided (208) then an additional check is made to see if sufficient funds are available in the account (210). In some cases, a temporary transfer may be made to the mobile carrier (210) to ensure the funds are available and not used in the interim. Settings associated with the mobile device may specify a preference to transfer a monetary value from a bank account from the financial institution (212) rather than through a credit line with the mobile carrier due to more favorable interest rates or terms. If the funds are available in either of these or other locations then the monetary value is stored in the electronic wallet associated with the requesting mobile device (220).

An alternative course of events occurs when the mobile device does not have an associated bank account (208) or there are insufficient funds in the bank account to complete the transaction (210). In this case, an initial determination is made to see if there has been sufficient credit extended from the mobile carrier in the mobile device account to fulfill the request for the monetary value (214). With sufficient credit, the mobile carrier enters a charge against the mobile device account to fulfill the request for the monetary value (218). Once again, the monetary value is stored in the electronic wallet associated with the requesting mobile device (220). On the other hand, insufficient credit results in the request for additional or any monetary value being denied (216). In this case, a message may be sent to the mobile device indicating that the transaction has been denied due to insufficient funds or available credit in the account.

Figure 3:
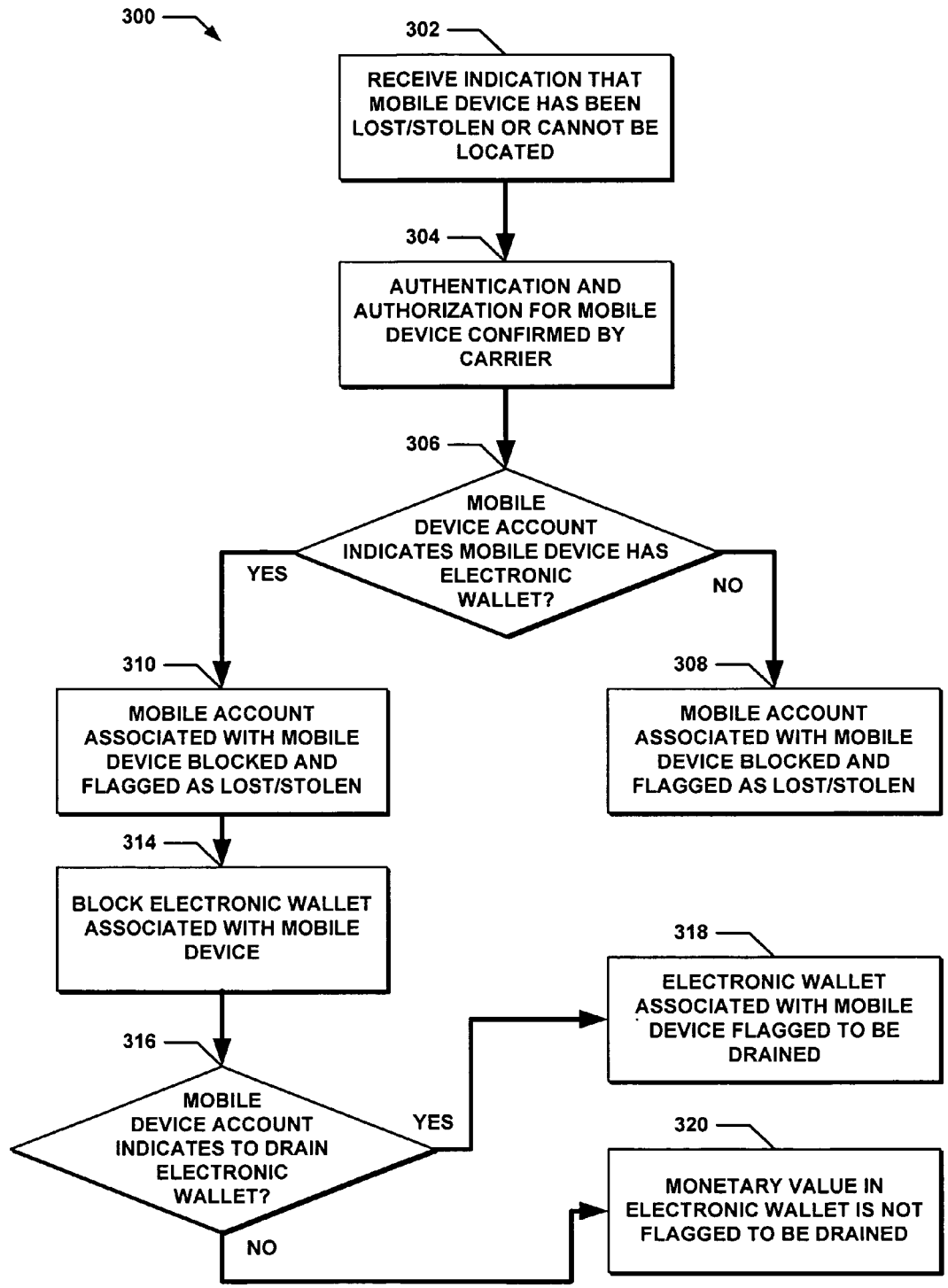
FIG. 3 is a flowchart diagram of the operations that take place in the event a mobile device is lost or stolen in accordance with one implementation of the present invention.

FIG. 3 is a flowchart diagram 300 of the operations that take place in the event a mobile device cannot be located and is lost or stolen. As with any lost or stolen item, it is important that the mobile carrier receives an indication or report that the mobile device has been lost, stolen or generally cannot be located (302). To reduce fraudulent behavior, one or more authentication and authorization routines are invoked to ensure that the report and person filing the report are genuine (304). These authentication and authorization operations may include requesting a PIN, social security information, personal information or any combination of items. Certain limitations to this process may exist if the mobile device is not readily available and the ESN for the mobile device is not easily known or determined.

Next, the mobile carrier checks a mobile device account to determine if the mobile device has an associated electronic wallet capable of storing monetary value (306). In the event that no electronic wallet has been configured or used on the mobile device then there is no risk of losing a monetary value from the electronic wallet. Accordingly, the mobile device account associated with the mobile device may be blocked and flagged as lost/stolen (308). It is important to recognize that a mobile device flagged as lost or stolen should also be denied the opportunity to thereafter create an electronic wallet unless the block is cleared by the rightful owner. For example, this would prevent a new wallet from being created on a phone identified as lost or stolen.

Conversely, if an electronic wallet has been created, the mobile carrier may first block the mobile account associated with the mobile device as it has been lost/stolen and should not be allowed to use voice/data functionalities (310). In addition, the mobile carrier is also made responsible for blocking the electronic wallet associated with the mobile device (314). Even though the electronic wallet has been created, this blocked designation or flag prevents any further transactions from taking placing using the electronic wallet. For example, no further monetary value can be added, removed or spent from the electronic wallet. This could be useful if a mobile device has been temporarily misplaced and there is a desire to continue using the electronic wallet and monetary value contained therein at a later date/time. Consequently, the temporarily misplaced electronic wallet can be flagged as blocked but otherwise left intact. Specifically, the mobile device account may additionally indicate whether the electronic wallet should be drained or not drained of monetary value (316). Monetary value in the electronic wallet is not removed if the flag indicates the money should not be drained (320).

When recovering the mobile device and electronic wallet is unlikely, the mobile device account may instead be flagged to indicate that the electronic wallet should be drained (316). Flagging the electronic wallet to be drained generally involves placing an entry in the mobile device account rather than taking an immediate action (318). The draining of the electronic wallet occurs the next time the mobile device is turned on and registers onto the data or voice network managed by the mobile carrier. It may also occur when a POS unit indicates a transaction is about to take place or in some cases immediately if the device is already on and within range of a communication base station or similar device. Monetary value in the electronic wallet can be drained and returned to a bank account associated with the mobile device, transferred to a new mobile device and corresponding electronic wallet, held in trust in a suspense account by the mobile carrier while a new mobile device is obtained and electronic wallet configured or may applied in part or in whole to pay an invoice from the mobile carrier. Once again, the mobile carrier benefits by making some or all interest on the money held in trust and also provides a strong incentive for the current mobile device user to buy another phone and transfer the money to the new electronic wallet.

Figure 4A:
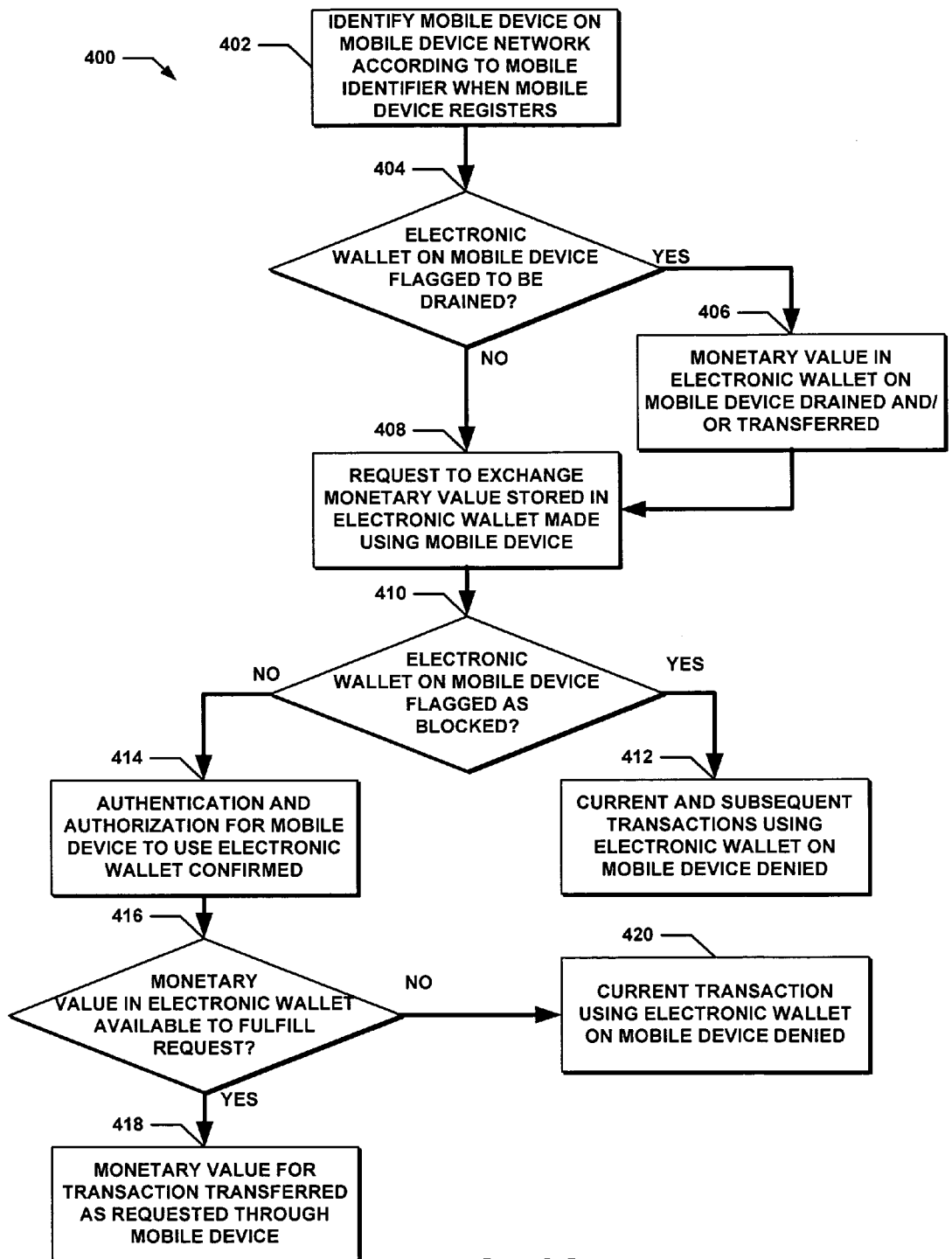
FIG. 4A is a flowchart diagram illustrating the operations associated with transacting a monetary value from a mobile device in accordance with one implementation of the present invention.

FIG. 4A is a flowchart diagram 400 illustrating the operations associated with transacting a monetary value from a mobile device. As part of an initialization, identification of a mobile device is made according to a mobile identifier when the mobile device registers (402). Generally, a mobile device needs to first register and gain permission before using data/voice networks provided by the mobile carrier. For example, a mobile device is likely to be denied access to the data/voice network if invoices have not been paid in a timely manner.

Next, the mobile carrier determines if the mobile device and electronic wallet is flagged to be drained of monetary value, if any (404). This determination checks if the mobile device has been reported as lost/stolen and the corresponding electronic wallet flagged in advance to be drained. If draining the electronic wallet is indicated in the mobile device account, implementations of the present invention drains the electronic wallet of all or some of the stored monetary value as requested (406). As previously mentioned, it may be desired not to drain the electronic wallet if it has been temporarily misplaced rather than permanently lost or stolen. There also may be a desire to drain only a portion of the monetary value from the electronic wallet so the amount to be drained can also be specified.

At some later point in time subsequent to registering the mobile device with the mobile carrier, the mobile device requests to transact a monetary value stored in the electronic wallet (408). A threshold determination is made to see if the mobile device account indicates that the mobile device has generally been flagged as blocked (410). With regards to the electronic wallet, the flag indicating the mobile device is blocked prevents the requested transaction from occurring. Accordingly, the current and subsequent transactions using the electronic wallet on the mobile device are denied (412).

Even when the electronic wallet is not blocked, authentication and authorization routines are performed to reduce fraudulent and unauthorized transactions (414). A PIN number, the ESN of the mobile device and other information can be used to ensure the authenticity of the user of the mobile device and proper authorization is granted. An RFID can also be used for the authentication and authorization operations used in the transactions. In the event lower security or authentication is required, it may be sufficient to pass an authentication and authorization routine by simply providing a PIN and not the ESN of the mobile device.

A comparison is made between the requested monetary value and the monetary value in the electronic wallet to see if the request can be fulfilled (416). If all the monetary value was flagged to be drained (406) then no monetary value is available and the current transaction using the electronic wallet is denied (420).

However, if less than all or none of the account has been drained of monetary value then it is possible that sufficient monetary value exists to perform the requested transactions (416). After performing these indicated operations the monetary value requested for the transaction may be transferred through the mobile device (418). For example, the mobile device can transfer a monetary value through an RFID tag up to a POS unit in exchange for a service or specified goods.

Figure 4B:
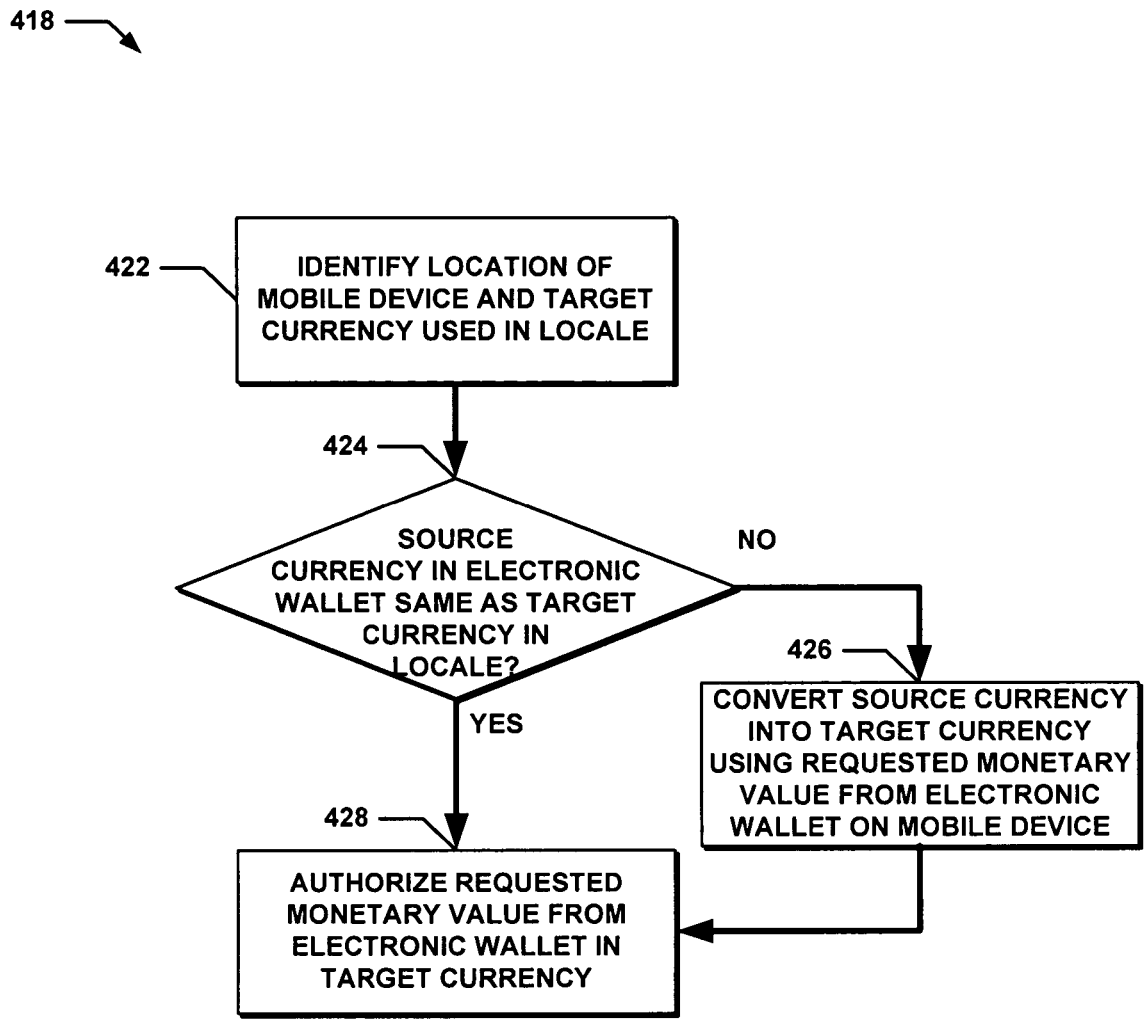
FIG. 4B is a flowchart diagram of the operations to potentially convert between a target currency and a source currency associated with an electronic wallet in accordance with one implementation of the present invention.

FIG. 4B is a flowchart diagram 418 of the operations to potentially convert between a target currency and a source currency associated with an electronic wallet in accordance with one implementation of the present invention. Using one or more approaches, a mobile carrier identifies the location of a mobile device and the target currency used in the corresponding locale (422). Mobile devices can be located using triangulation among several base stations, global positioning satellites (GPS) or one or several base stations in combination with a detected power signal. Based on this information, a currency table entry is located that corresponds to the locale.

Determining that the source currency in the electronic wallet is the same as the target currency in the locale (424) generally does not require a conversion. However, if the source and target currencies are different then a conversion is made between the source currency into the target currency using the conversion table for the requested monetary value (426). For example, it may be possible when purchasing goods in a duty-free shop in an airport of similar location to specify the currency for a purchase even though it differs from the actual currency of the locale. Once the conversion issues are addressed, implementations of the present invention authorized the requested monetary value to be paid out from the electronic wallet in the target currency but charged agains the wallet in the source currency.

Figure 5:
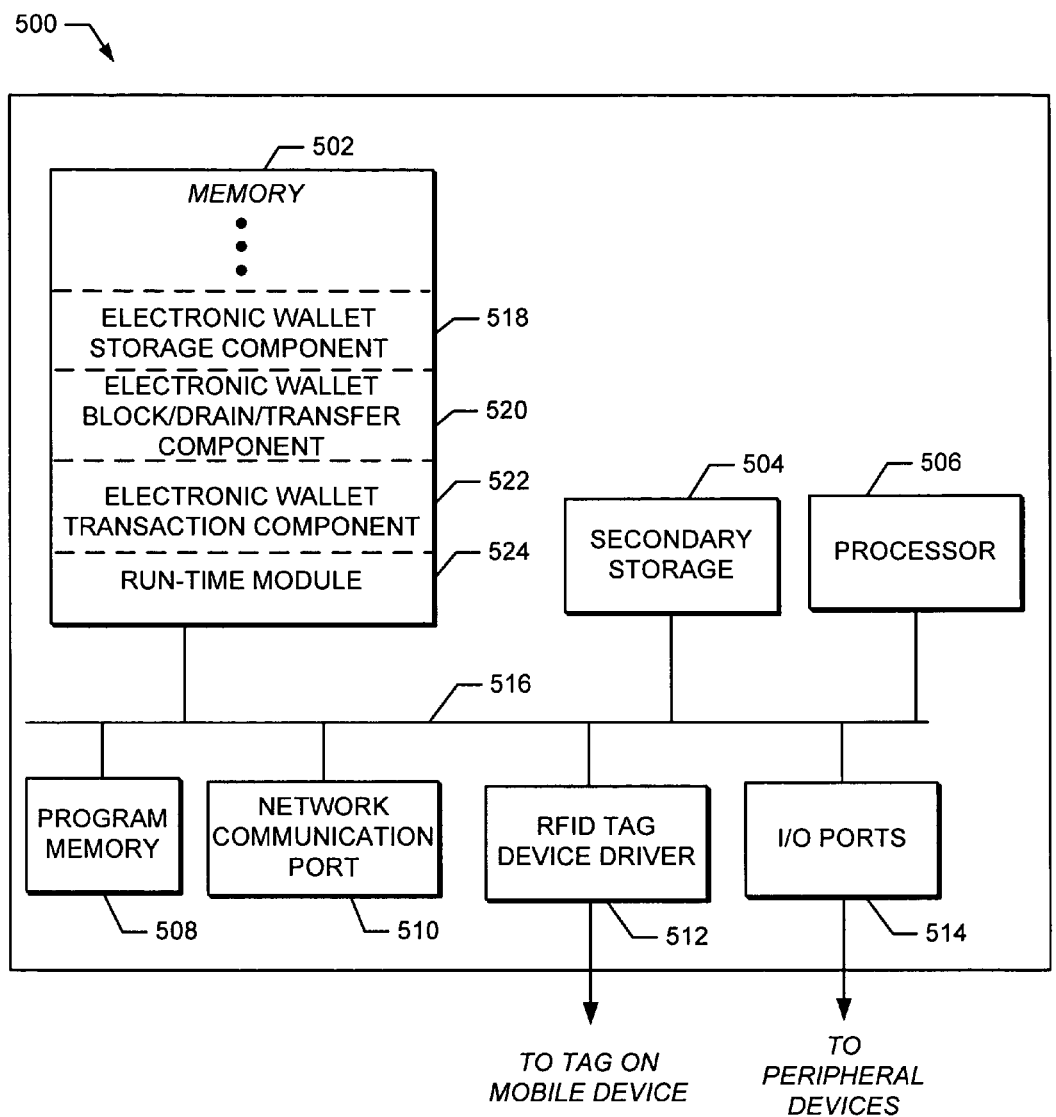
FIG. 5 is a schematic diagram of a system for managing the monetary value on a mobile device in accordance with one implementation of the present invention.

FIG. 5 is a schematic diagram of a system 500 for managing the monetary value on a mobile device in accordance with one implementation of the present invention. System 500 includes a memory 502 to hold executing components or programs (typically random access memory (RAM) or read-only memory (ROM) such as a flash RAM), a processor 506, a program memory 508 used for cache or temporary high-speed storage, a network communication port 510 for data communication, an RFID tag device driver 512 and input/output (I/O) ports 514 with integrated I/O controller operatively coupled together over an interconnect 516. System 500 can be preprogrammed, in ROM, for example, using field-programmable gate array (FPGA) technology or it can be programmed (and reprogrammed) by loading a program from another source (for example, from a floppy disk, a CD-ROM, or another computer). Also, system 500 can be implemented using customized application specific integrated circuits (ASICs).

In one implementation, memory 502 includes an electronic wallet storage component 518, an electronic wallet block/drain/transfer component 520, an electronic wallet component 522 and a run-time module 524 that manages the resources associated with system 500. In operation, electronic wallet storage component 518 processes requests to load an electronic wallet with monetary value and keeps track of the monetary value loaded into the electronic wallet.

Electronic wallet block/drain/transfer component 520 responds to requests from a mobile carrier to change the status of the electronic wallet. For example, the status of an electronic wallet on a mobile device can entered as blocked thus preventing it from being used in subsequent transactions. The electronic wallet can also be drained of monetary value thus causing the system 500 to essentially empty the electronic wallet of all or some monetary value. In the event there is monetary value in the electronic wallet and it is not blocked, electronic wallet transaction component 522 causes the mobile device to exchange monetary value with a POS unit or other device through an RFID tag coupled through RFID tag device driver 512 and interface.

While examples and implementations have been described, they should not serve to limit any aspect of the present invention. Accordingly, implementations of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs.

While specific embodiments have been described herein for purposes of illustration, various modifications may be made without departing from the spirit and scope of the invention. Accordingly, the invention is not limited to the above-described implementations, but instead is defined by the appended claims in light of their full scope of equivalents.

What is claimed is:

1. A method for associating a monetary value with a mobile device, comprising:
   receiving a request to store a monetary value into an electronic wallet of a mobile device having a mobile identifier;
   denying a request to store the monetary value into the electronic wallet of a mobile device when the electronic wallet of the mobile device has been flagged as blocked;
   determining if the mobile identifier assigned to the mobile device is associated with a bank account from a financial institution in addition to a mobile device account of a mobile device carrier;
   transferring monetary value from the bank account to the mobile device account of the mobile device carrier in response to the determination and provided the bank account contains at least sufficient funds to fulfill the request for the monetary value; and
   storing the monetary value requested to the electronic wallet of the mobile device having the mobile identifier.

2. The method of claim 1 further comprising sending a message to the device if the bank account does not contain sufficient funds to transfer the requested monetary value to the device.

3. The method of claim 1 further comprising charging the mobile device account corresponding to the monetary value requested when the bank account does not contain sufficient funds to transfer the requested monetary value to the device.

4. The method of claim 1 wherein the request to store a monetary value further comprises:
   identifying a source currency according to a default setting in the mobile device account;
   determining if the source currency for the mobile device account is different from a requested target currency;
   converting the source currency into the target currency for the electronic wallet of the mobile device using a conversion table; and
   revising the monetary value requested based upon the conversion between the source currency and target currency indicated in the conversion table.

5. The method of claim 1 wherein the mobile identifier includes an electronic serial number (ESN) assigned to the mobile device at the time of manufacture.

6. The method of claim 1 wherein a mobile carrier for the mobile device is provided authorization to access the bank account and the mobile device account upon receipt of a matching personal identification number (PIN).

7. The method of claim 1 wherein the mobile identifier includes an RFIO, obtained from an RFID tag associated with the mobile device.

8. The method of claim 1 wherein the charge to the mobile device account is limited by a credit line granted by a mobile carrier for the mobile device.

9. The method of claim 1 wherein the mobile device communicates using one or more protocols selected from a set of protocols including: Bluetooth, RFID, near-field communication (NFC), infra-red, and other wireless communication mediums.

10. A method of managing a monetary value stored in an electronic wallet of a mobile device, comprising:
    receiving an indication that the mobile device from a mobile device account of a mobile device carrier cannot be located;
    determining if the mobile device has an associated electronic wallet capable of storing monetary value; and
    blocking use of mobile device and access to electronic wallet in response to determination that mobile device has an associated electronic wallet.

11. The method of claim 10 further comprising:
    flagging the electronic wallet associated with mobile device to be drained of monetary value.

12. The method of claim 10 wherein a mobile carrier for the mobile device is provided authorization to manage the monetary value associated with the electronic wallet upon receipt of a personal identification number (PIN) associated with the mobile device account.

13. The method of claim 10 wherein the authorization to manage the monetary value is further dependant upon receiving an electronic serial number (ESN) assigned to the mobile device at the time of manufacture.

14. The method of claim 10 further comprising,
    indicating the monetary value to be drained from the electronic wallet should be transferred to another electronic wallet on a second mobile device designated as a replacement for the mobile device that cannot be located.

15. The method of claim 10 further comprising,
    indicating that the monetary value to be drained from the electronic wallet should be held in the mobile device account until a second mobile device and another electronic wallet can be designated as a replacement for the mobile device that cannot be located.

16. The method of claim 10 further comprising,
    indicating the monetary value to be drained from the electronic wallet should be returned to a bank account from a financial institution.

17. A method of transacting a monetary value stored in an electronic wallet, comprising:
    identifying a mobile device on a mobile device network according to a mobile identifier associated with the mobile device;
    determining if the mobile device on the mobile device network has an electronic wallet to be drained of monetary value;
    draining a monetary value from the mobile device in response to the determination by removing a predetermined amount of monetary value from the electronic wallet associated with the mobile device; and
    providing the monetary value to a recipient, wherein the providing further includes identifying a location of the mobile device and a corresponding target currency used in the locale;
    determining if a source currency in the electronic wallet of the mobile device is the same as the target currency in the locale;
    converting the source currency into the target currency through a conversion table in an amount corresponding to the requested monetary value; and
    authorizing the requested monetary value from the electronic wallet in the target currency for the transaction.

18. The method of claim 17 further comprising:
    comparing a requested monetary value requested for a transaction with available monetary value in electronic wallet of the mobile device; and
    performing the providing of the monetary value to the recipient as requested when the electronic wallet has available monetary value.

19. The method of claim 17 wherein the mobile identifier is received when the mobile device is turned on and registered on the mobile device network.

20. The method of claim 17 wherein the mobile identifier includes an electronic serial number (ESN) assigned to the mobile device at the time of manufacture.

21. The method of claim 17 wherein the mobile device provides authorization to transfer the requested monetary value for the transaction upon receipt of a personal identification number (PIN) associated with the electronic wallet.

22. A computer program product for associating a monetary value with a mobile device, tangibly stored on a computer readable medium, comprising instructions operable to cause a programmable processor to:
- receiving a request to store a monetary value into an electronic wallet of a mobile device having a mobile identifier;
- denying a request to store the monetary value into the electronic wallet of a mobile device when the electronic wallet of the mobile device has been flagged as blocked;
- determining if the mobile identifier assigned to the mobile device is associated with a bank account from a financial institution in addition to a mobile device account of a mobile device carrier;
- transferring monetary value from the bank account to the mobile device account of the mobile device carrier in response to the determination and provided the bank account contains at least sufficient funds to fulfill the request for the monetary value; and
- storing the monetary value requested to the electronic wallet of the mobile device having the mobile identifier.

23. A computer program product for managing a monetary value stored in an electronic wallet of a mobile device, tangibly stored on a computer readable medium, comprising instructions operable to cause a programmable processor to:
- receiving an indication that the mobile device from a mobile device account of a mobile device carrier cannot be located;
- determining if the mobile device has an associated electronic wallet capable of storing monetary value; and
- blocking use of mobile device and access to electronic wallet in response to determination that mobile device has an associated electronic wallet.

24. A computer program product for transacting a monetary value stored in an electronic wallet, tangibly stored on a computer readable medium, comprising instructions operable to cause a programmable processor to:
- identifying a mobile device on a mobile device network according to a mobile identifier associated with the mobile device;
- determining if the mobile device on the mobile device network has an electronic wallet to be drained of monetary value;
- draining a monetary value from the mobile device in response to the determination by removing a predetermined amount of monetary value from the electronic wallet associated with the mobile device; and
- providing the monetary value to a recipient, wherein the providing further includes identifying a location of the mobile device and a corresponding target currency used in the locale;
    - determining if a source currency in the electronic wallet of the mobile device is the same as the target currency in the locale;
    - converting the source currency into the target currency through a conversion table in an amount corresponding to the requested monetary value; and
- authorizing the requested monetary value from the electronic wallet in the target currency for the transaction.

* * * * *

UNITED STATES PATENT AND TRADEMARK OFFICE
CERTIFICATE OF CORRECTION

| | | |
|---|---|---|
| PATENT NO. | : 7,819,307 B2 | Page 1 of 1 |
| APPLICATION NO. | : 11/260061 | |
| DATED | : October 26, 2010 | |
| INVENTOR(S) | : Robert E. Lyons et al. | |

It is certified that error appears in the above-identified patent and that said Letters Patent is hereby corrected as shown below:

In column 11, line 53, in Claim 7, delete "RFIO" and insert -- RFID --, therefor.

Signed and Sealed this
Twenty-third Day of August, 2011

David J. Kappos
*Director of the United States Patent and Trademark Office*